Sept. 1, 1970  C. W. WERNTZ  3,526,319
ARTICLE HANDLING APPARATUS AND CONTROL MEANS THEREFOR
Filed March 15, 1968  3 Sheets-Sheet 1

INVENTOR:
CHARLES W. WERNTZ
BY
ATTORNEYS.

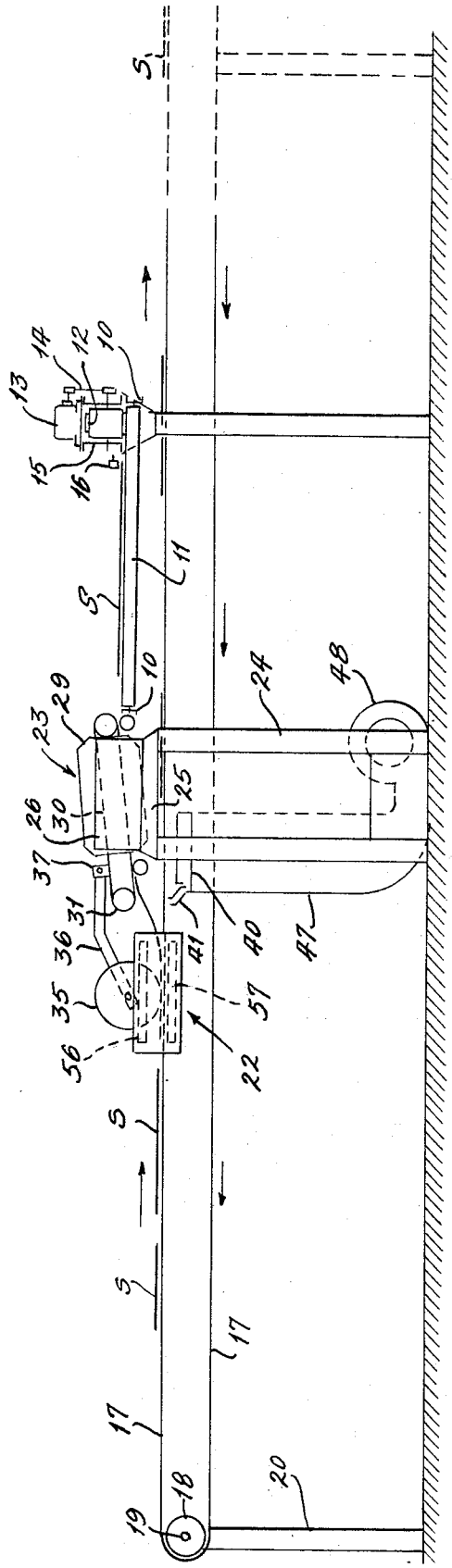
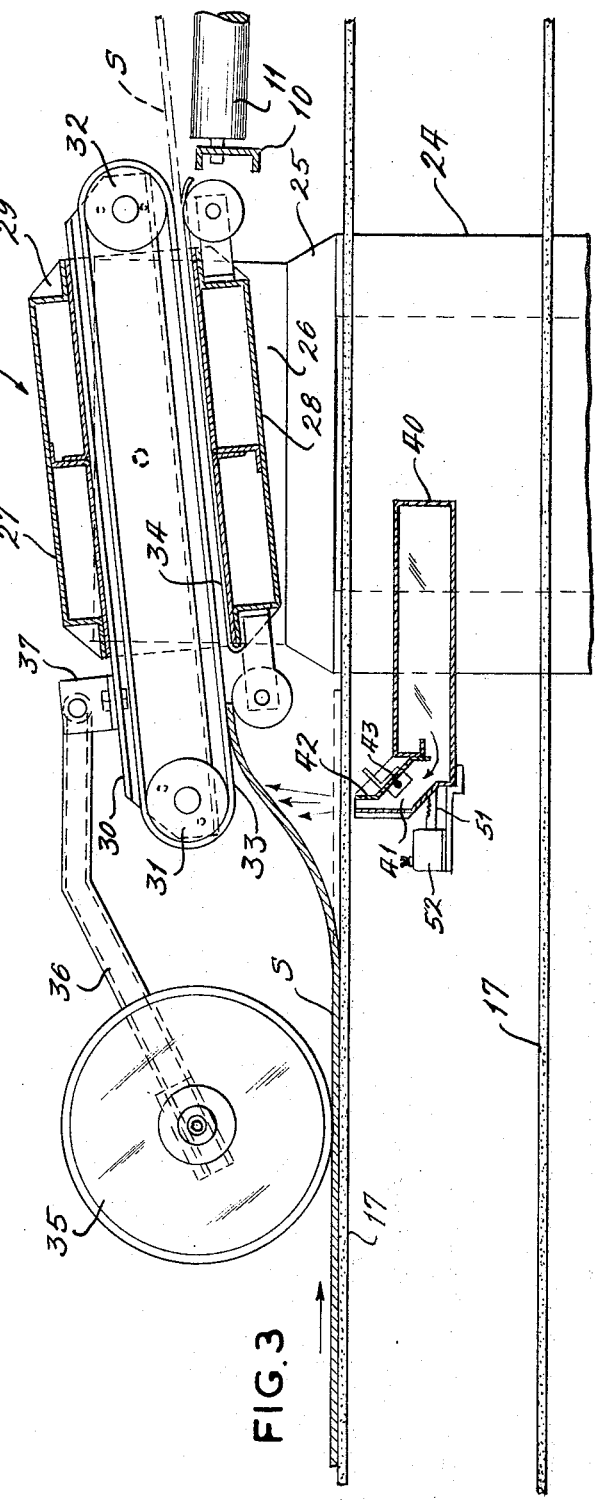
FIG.2
FIG.3
INVENTOR:
CHARLES W. WERNTZ

United States Patent Office
3,526,319
Patented Sept. 1, 1970

1

3,526,319
ARTICLE HANDLING APPARATUS AND
CONTROL MEANS THEREFOR
Charles W. Werntz, Ferguson, Mo., assignor to Alvey,
Inc., St. Louis, Mo., a corporation of Missouri
Filed Mar. 15, 1968, Ser. No. 713,365
Int. Cl. B07c 5/08
U.S. Cl. 209—73
9 Claims

ABSTRACT OF THE DISCLOSURE

Article handling apparatus in which control means is embodied for sensing the presence of articles or material and for controlling the movement thereof such as accepting or rejecting certain of the articles or materials, as well as sensing the continuity or discontinuity of the movement of the articles or materials, or sensing the number of articles or quantity of material passing a reference station.

---

This invention relates to improvements in article handling apparatus and is particularly concerned with novel control means for exercising a controlling influence on the apparatus to determine the movement or quantity of articles or materials being handled.

In apparatus for conveying or sorting articles there has been a long standing problem that some articles are so varied in certain physical characteristics that it practically defies the successful application of known controlling or sensing means to do the job of distinguishing between, or merely sensing the movement of such material. There are, of course, articles or materials which require movement from one place to another that exhibit an extremely wide variation in certain physical characteristics such that the presently available means for exercising control, or controlling the movement thereof is inadequate. Attempts have been made to utilize certain of the presently known sensing control means in multiples but these attempts have generally failed because of the wide variation in characteristics of the individual units or extreme difficulty in unifying the individual units of a group or multiple thereof to produce uniform results.

It is, therefore, an important object of this invention to provide control means which will successfully overcome the problems that have existed heretofore.

It is another important object of this invention to provide a novel and simple control means for article or material sorting and conveying apparatus.

Still another object of this invention is to provide a light responsive control means which will produce a signal that can be utilized to initiate a required control function.

An additional object of the present invention is to provide a unique control means having a linear light source and a corresponding light receiver arranged in spaced relation so that articles or material moving between the source and the receiver will generate a response in the transmission of the light between the source and the receiver which can be translated easily into an electrical or other signal.

Still another object of the present invention is to provide control means which may be utilized in multiples for the purpose of controlling the movement or sorting of articles or material having certain predetermined physical characteristics.

Other objects of the present invention will be set forth in connection with the disclosure of a preferred embodiment which is illustrated in the acompanying drawings. A preferred embodiment of the present invention, but without inferring any restriction or limitations, includes conveying apparatus for handling sheet material that randomly

2 varies in width or in a dimensional character and for sensing variations in the width or physical characteristics preselected for purposes of sorting out sheets having a predetermined physical characteristic from those that do not. In the preferred embodiment the control means may include a linear or elongated light source and a cooperating light receiver located so that the passage of light from the source to the receiver can be intercepted by the moving sheet material, and the light receiver is provided with a light responsive element which will produce a signal corresponding to the predetermined characteristic of the sheet material which it is desired to sense and on which basis a proper sorting control function can be initiated. There is also included in the preferred embodiment a disclosure wherein the features of the present invention may be organized in a multiple or series arrangement for obtaining refinements in the sensing function which produces the desired control.

In the drawings:

FIG. 2 is a fragmentary elevational view of one of the sorting stations shown in FIG. 1, taken at line 2—2 therein;

FIG. 3 is a greatly enlarged fragmentary sectional view showing means for switching sheet material to be sorted from one conveyor to a second conveyor, the view being taken at line 3—3 in FIG. 1;

Figure 1:
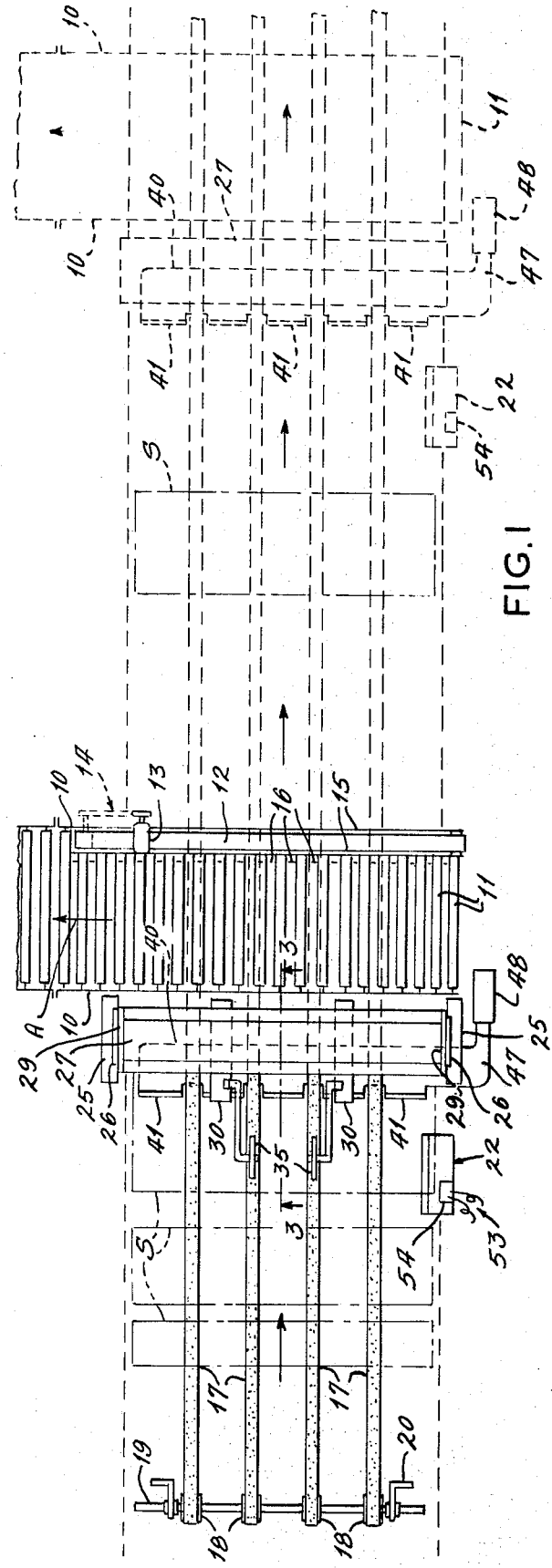
FIG. 1 is a somewhat schematic plan view of article conveying and sorting apparatus which includes the control means of the present invention and shows the application of a plurality of control means in a multiple station, article sorting conveyor.

In the drawings reference will be made to FIGS. 1 and 2 where it can be seen that the preferred apparatus includes a suitable frame 10 which supports the horizontally directed bed of rollers 11, which rollers are driven by motor 13 which is connected by a suitable chain drive 14 to one of the end pulleys driving the belt 12. The drive belt 12 is retained in position between structural frame members 15 to which one of the frame members 10 of the bed of rollers 11 is connected. A suitable picket fence type backstop 16 is carried by one of the frame members 15 in position to be abutted by the leading edge of a sheet of material S which the apparatus is designed to sort in accordance with variations in the width of the sheets. The sheets that are deposited on the bed of rollers 11 are quickly removed by the drive belt 12 rotating the rollers 11 so that the sheet goes away in the direction of the arrow A. Sheets being brought into the apparatus from the left hand end thereof and which are not deposited on the bed of rollers 11 pass on through on the supporting belts 17 and continue to a second sorting station which is shown in phantom outline only since it embodies structural and operational features which are the equivalent of those to be described in connection with the first sorting station. The belts 17 are supported on suitable pulleys 18 which are carried on a drive shaft 19 suitably bearinged in a frame structure 20. The opposite end of the belt 17 may be likewise supported although it is not believed necessary to show the same.

The means for sorting sheet material S is shown in greater detail in FIGS. 2 and 3 and reference will be had to these views. The assembly shows control means 22 and diverter means 23. The diverter means 23 comprises a floor supported frame structure 24 having a top supporting frame 25. The frames 24 and 24 are deposed at each side of the lengthwise pass of the belts 17, and are interconnected by means of the provision of pivot plates 26 which carry a beam like, tiltable structure composed of an upper longitudinal frame 27 and a lower similar frame 28. These frames 27 and 28 are connected to end plates 29 in vertical spaced relation so that channel supports 30 may be deposed within the space between the frames 27 and 28 and supporting at its opposite ends rollers 31 and 32 for the purpose of supporting a friction belt 33. The lower pass of the belt 33 is spaced above the inner surface of the lower frame 28 such that a plurality of skids 34 may be spaced along the length of the frame 28 and extend in the direction of movement of the sheet material S. The skids 34 are spaced below the lower pass of the belt 33 to such an extent that the material S will be frictionally engaged on the belt 33 and propelled by the belt upwardly for deposit on the bed of rollers 11. There are a pair of such belts 33 supported between the ends of the frame 27, and each of the frames 30 operatively support stabilizing rollers 35, adjustably mounted on an arm 36 which is pivoted from a bracket 37 carried on the frame 30. The rollers 35 cause the leading edge of the sheet material S to stay down on the transport belts 17 so that any curl or physical deformation that may exist in the material will be corrected as the leading edge of the sheet material S approaches the diverter 23.

Figure 7:
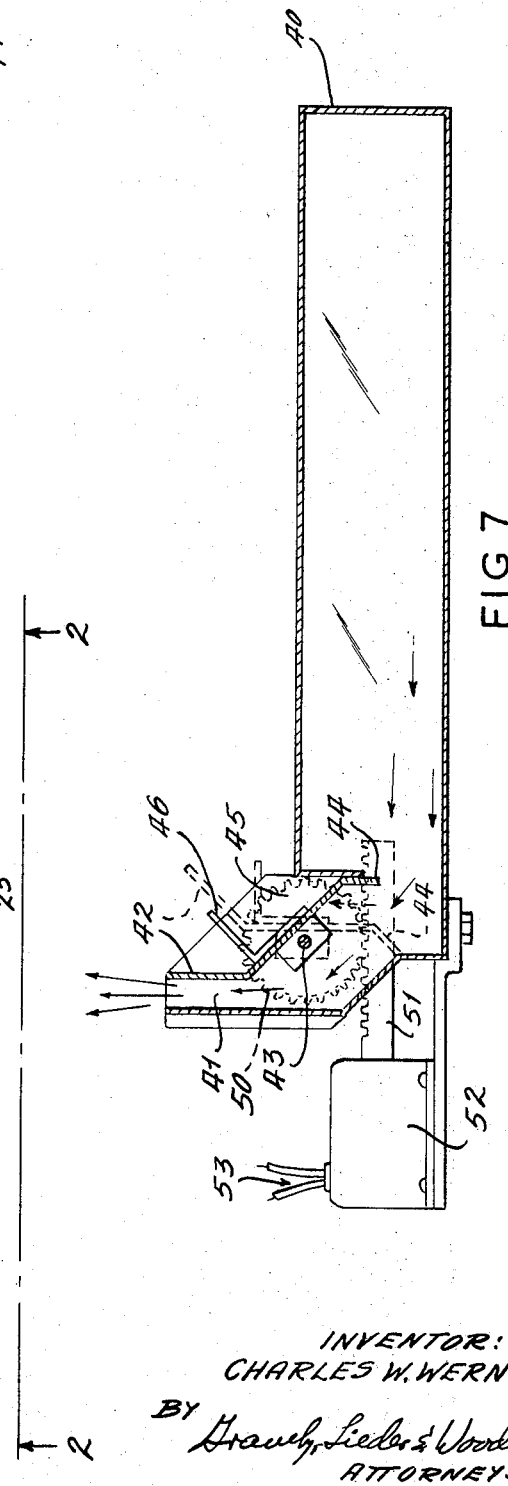
FIG. 7 is a greatly enlarged sectional view of the material switching means shown in FIG. 3.

The means for causing the leading edge of the sheet mateiral S to rise and engage the belts 33 (FIGS. 3 and 7) includes a manifold 40 from which lead a plurality of air passages 41 which are directed upwardly under the sheet S as shown in FIG. 3. There are a plurality of passages (FIG. 1) spaced along the lengthwise dimension of the sheet S so that substantially the full length of the leading edge of the sheet may be lifted by a blast of air issuing from the several passages 41. Each passage 41 is formed in part by a movable valve 42 having a pivot shaft 43. The valve 42 may rock back and forth such that the interior lip 44 opens the passage 41 or opens by-pass passage 45 around the lip 44 and under a diverter lip 46. During operation the motor-blower unit 48 is continuously operated to avoid lag time in air delivery at passages 41.

Operation of the valve 42 is obtained through a pinion gear 50 fastened to the shaft 43 and actuated by a rack member 51 which is responsive to a drive unit 52. The drive unit 52 receives its "operate" signal through leads 53 which run to an amplifier unit 54 (FIG. 1), and the amplifier is directed by control means now to be described. The unit 52 might operate a fluid motor connected to the rack 51 if desired.

Figure 4:
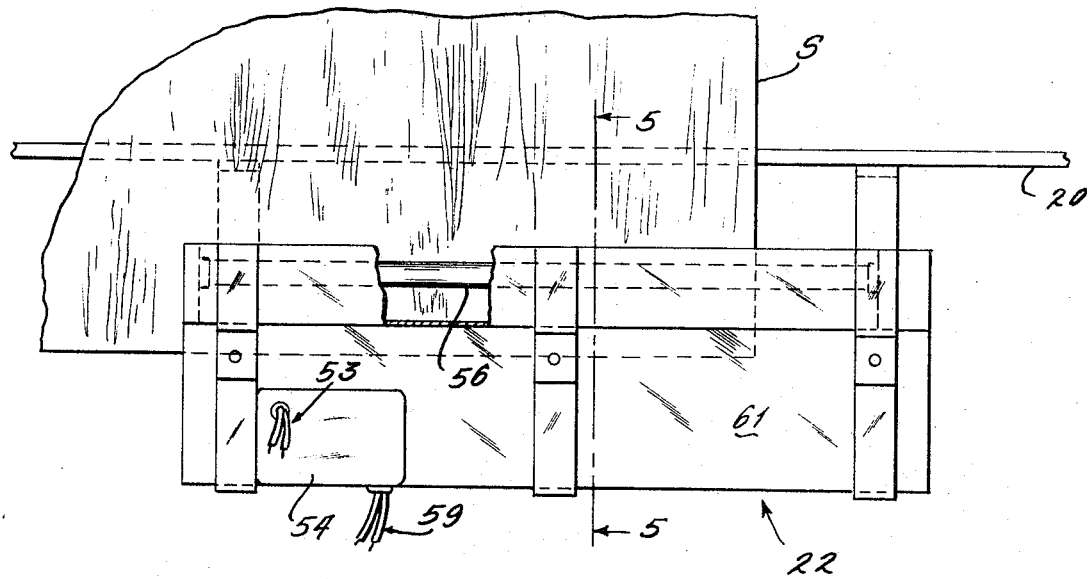
FIG. 4 is a greatly enlarged fragmentary plan view showing a preferred embodiment of the material switching control means of the present invention.
Figure 5:
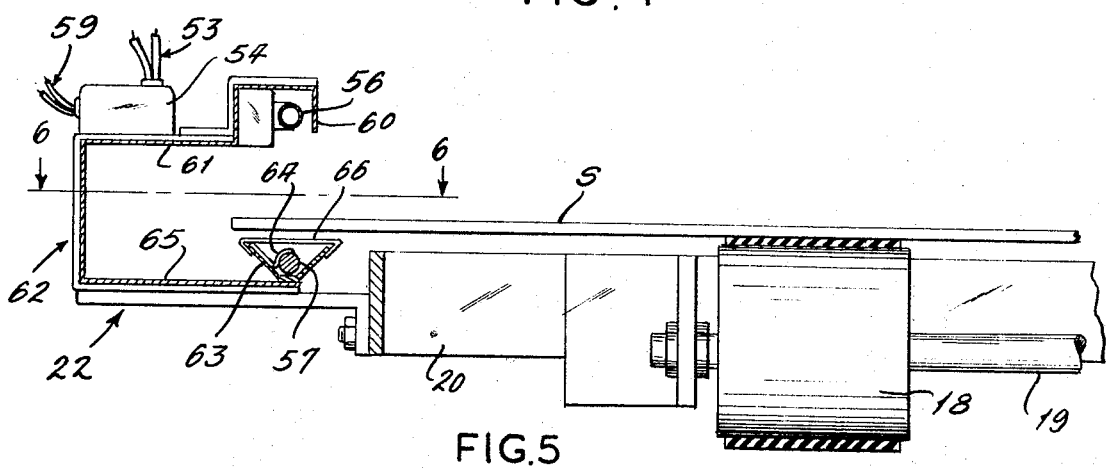
FIG. 5 is a greatly enlarged sectional view taken at line 5—5 in FIG. 4.
Figure 6:
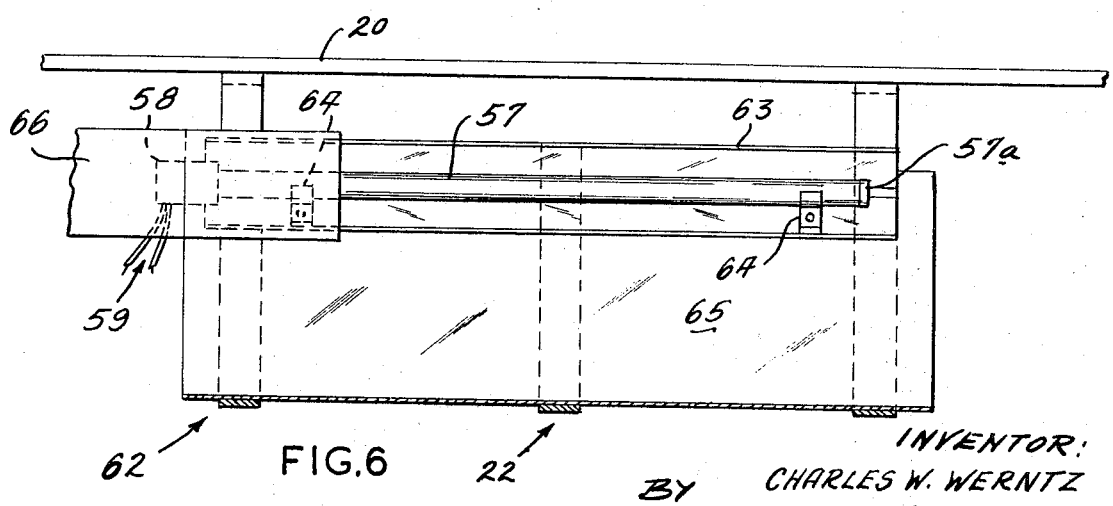
FIG. 6 is a fragmentary plan view taken at line 6—6 in FIG. 5.

In FIGS. 4, 5 and 6 the control means 22 includes an elongated light source 56 and a spaced elongated light receiver 57, the source and the receiver being substantially parallel and lying in the same plane. The marginal portion of the sheet material S passes between the light source and the light receiver to intercept the transmission of the light from one to the other. As is shown in FIG. 6, one end of the receiver 57 is provided with a light sensitive unit 58 such as photocell whose reaction to light will affect a change in resistance that is transmitted by leads 59 to the amplifier 54. The components in the amplifier 54 are conventional and are utilized to generate a voltage. The voltage thus generated will energize or de-energize suitable relay means in the unit 52 for controlling the air blast through the passages 41 which will lift the leading edge of the sheet material S when it is to be diverted from the belts 17.

The light source 56 is mounted in a supporting structure which includes a shield 60 to prevent extraneous or ambient light from affecting the light level of the source 56. The shield 60 is a part of the upper wall 61 of a guard 62 which is placed around the light receiver 57 and on which the light receiver may be mounted. The receiver 57 may be, if necessary, mounted in an open trough 63 by means of a pair of clamps 64, and the trough 63 is attached to the bottom wall 65 of the guard 62. As is indicated in FIG. 2, the light source 56 and the light receiver 57 are substantially the same in length and as long as the full length of each is exposed to the other the control unit 22 effectively responds to sheet material S whose width is at least equal to the length of the light receiver 57. It is possible, because of this that the light source 56 and receiver 57 may be considerably longer than the maximum width of the sheet material S to be sorted, and in this event the effective length of the light receiver 57 may be selected by the placement of a slide 66 over the trough 63 so as to cover more or less of the length of the receiver 57. This slide 66 is illustrated in FIGS. 5 and 6 to show that a certain portion of the left hand end of the light receiver 57 is cut off from receiving light from the source 56.

In operation the control means 22 will be set such that the length of the exposed part of the light receiver 57 will be just equal to the minimum width of the material S that is to be diverted by the air blast through passage 41 to the bed of rollers 11, and all material S which has a width less than the exposed length of the light receiver 57 will remain on the supporting belts 17 by reason of the control means 54 being energized to actuate the drive unit 52 for switching the valve 42 so that the air from manifold 40 will be diverted by the valve lip 44 and the means 46. The slide 66 can be used to adjust the exposed length of the light receiver 57 for whatever width is desired of the material to be sorted in the means shown in FIG. 3.

In the preferred form of the control means 22, the light receiver 57 may be a rod of acrylic material which has a polished exterior surface so that the light projected thereon from the light source 56 will pass into the rod and then be transmitted longitudinally toward the ends. a cap 57a (FIG. 6) is placed over the inoperative end of the light receiver rod 57 so that the light will only escape axially toward the photocell 58 for the purpose of energizing the photocell or other suitable light sensitive unit. The light source 56 may be either fluorescent or incandescent the criteria being that it yield a substantially uniform elongated source of light rather than to produce points of concentrated light that are spaced apart and which would normally result in a nonuniform delivery of light to the receiver 57. When the light source is broken up into concentrated points, as by the use of incandescent bulbs, the passage of the sheet material S lengthwise between the light source and the receiver will create variations in resistance or current output response of the sensitive unit 58 which will make it difficult to tune the amplifier components 54 and eliminate false operation of the drive unit 52 for the flow of air through the passage 41 or through the diversion passage controlled by the valve lip 44. It is also important in connection with providing a substantially uniform elongated light source to avoid having a series of concentrated light points because it is frequently encountered in practice that the sheet material may have split ends or holes which would normally increase the level of light getting into the receiver 57 and this would produce a false response at the amplifier 54.

The control means 22 might, instead of utilizing an arcyclic rod for the light receiver 57, be made up of a hard, tough resin material which will not scratch easily and will not soften at high room temperatures. Other materials might include a fused quartz rod with a highly polished outer surface, and the advantage here is that the quartz will not easily scratch and will resist temperatures up to 3000° F. as well as withstand rapid temperature changes without fracturing. As for the light source 56 it is deemed sufficient to provide a light generator with a frequency spectrum having a wave length which is compatible with the refractive index of the generator material. That is a light source with an index high enough to off-set subside band interference and be optically filtered to operate with normal photo-sensitive devices. One such source could be ultra-violet having wave lengths that are at a very low level of flux anywhere except in sunlight. The light gathering response of the receiver 57 is important and the angle of incidents of the light striking the polished or smooth surface of receiver 57 should be such that the light entering the receiver rod cannot get out until it reaches the end to which the photo-sensitive unit 58 is attached.

In one apparatus for sorting veneer the source 56 and receiver were spaced apart about four inches and were about thirty inches long. All veneer which totally eclipsed the receiver 57 was switched by the air blast from passages 41 to the table of rollers 11, while those that did not eclipse the receiver were not sensed and remained on the belts 17. In such apparatus the motor-blower is constantly driven to maintain movement of air in the manifold 40 and the valve 42 diverted the air blast in passage 45 until the eclipse of the receiver caused response at the photo-sensitive unit 58 to operate means 52 to shift the valve 42 to deliver the air blast under the sheet S.

There has been described above the features and components of a preferred form of the present invention. Certain modifications and alternate components have been referred to wherever possible, and it is understood that those skilled in this art may make modifications and changes based on the information in this specification. Accordingly, it is intended that all possible changes and modifications shall be included within the spirit and scope of the appended claims.

What is claimed is:

1. In apparatus for handling articles having a linear dimension, the combination which includes: a first conveyor adapted to move articles in a first path; a second conveyor located to one side of said first conveyor and adapted to move articles in a second path; switching means adjacent both said conveyors adapted to divert articles from said first to said second conveyor; and control means adjacent the first path in advance of said switching means and operably connected to said switching means to cause the latter to effect article switching, said control means including a light source, a light receiver exposed to and spaced from said source, said spacing of said source and receiver permitting articles to pass therebetween, and said light source and receiver extending in the direction of movement of the articles being handled and for a distance substantially equal to a minimum desired dimension of the articles to be diverted, and light senesitive means connected to said light receiver and to said switching means, said light sensitive means being adapted to respond to the total eclipse of light in said receiver by material having at least the minimum desired dimension to operate said switching means and divert the latter articles to said second path.

2. The combination set forth in claim 1 wherein said light source and receiver are elongated and substantially equal in length and operate said switching means in response to a dimensional characteristic of articles which substantially matches the length of said receiver.

3. The combination set forth in claim 2 wherein shielding means is provided to change the effective length of said light receiver exposed to said light source.

4. The combination set forth in claim 1 wherein said switching means includes a source of air under pressure, air passage means opening transversely of said second path, and valve means selectively movable in response to said control means to deliver pressure air through said air passage means to divert the articles and to divert the pressure air away from diverting the articles.

5. In apparatus for handling articles having a linear dimension, the combination which includes: a pair of article moving conveyors providing divergent paths for movement of articles thereover; article sensing means adjacent the path of articles moved by one of said conveyors and comprising an elongated source of light extending in the direction of said one conveyor movement and being on one side of said one conveyor path and an elongated light receiver extending parallel to and being opposed to said light source on the opposite side of said one conveyor path, said light receiver being substantially blocked off from said light source by certain of the articles moved by said one conveyor having a dimension at least equal to said light receiver; article switching means adjacent the other of said pair of conveyors in position to feed the certain articles on to said other conveyor; and means activating said switching means in response to article blocking of said light receiver, said activating means being connected to said light receiver.

6. The combination set forth in claim 5 wherein said light receiver is an elongated member receiving light therein from said light source, and said activating means is a light sensitive unit connected to said elongated member.

7. The combinaton set forth in claim 5 wherein said light receiver is an elongated member absorbing light therewithin along its length and emitting absorbed light along its axis, said light source is an elongated member emitting light along its length; and said activating means is a light sensitive unit connected axially to said light receiver, said light receiver having an effective light absorbing length at least equal to the length of said light source.

8. The combination set forth in claim 7 and including means shielding said light source against ambient light.

9. The combination set forth in claim 7 and including means adjacent said light receiver to reflect light thereinto from areas along the sides of its length, said reflection means being exposed to said light source.

References Cited

UNITED STATES PATENTS

| 3,061,732 | 10/1962 | Milnes | 250—219 |
| 3,317,738 | 5/1967 | Piepenbrink et al. | 250—219 |
| 3,327,850 | 6/1967 | Simmons | 250—219 |
| 3,331,963 | 7/1967 | Lippke | 250—219 |

ALLEN N. KNOWLES, Primary Examiner

U.S. Cl. X.R.

209—82, 111.7